United States Patent
Springs

(10) Patent No.: US 6,918,236 B2
(45) Date of Patent: Jul. 19, 2005

(54) BREATHABLE EQUINE LEG WRAP

(75) Inventor: Michael A. Springs, Leawood, KS (US)

(73) Assignee: Ortho-Care, Inc., Raytown, MO (US)

( * ) Notice: Subject to any disclaimer, the term of this patent is extended or adjusted under 35 U.S.C. 154(b) by 0 days.

(21) Appl. No.: 10/219,213

(22) Filed: Aug. 14, 2002

(65) Prior Publication Data

US 2004/0031246 A1 Feb. 19, 2004

(51) Int. Cl.[7] .......................... A01K 29/00; B68C 5/00
(52) U.S. Cl. ........................................ 54/82; 119/850
(58) Field of Search ............................ 54/82; 119/850; D30/146, 147; 168/1, 2; 428/308.4

(56) References Cited

U.S. PATENT DOCUMENTS

| | | | | |
|---|---|---|---|---|
| 5,115,627 A | * | 5/1992 | Scott | 54/82 |
| D329,108 S | * | 9/1992 | Boyd | D30/146 |
| 5,579,627 A | * | 12/1996 | Vogt | 54/82 |
| 5,637,389 A | * | 6/1997 | Colvin et al. | 428/308.4 |
| 5,871,458 A | * | 2/1999 | Detty | 54/82 |
| 5,910,126 A | * | 6/1999 | Wilson et al. | 119/850 |
| 6,151,873 A | * | 11/2000 | Rogers | 54/82 |
| 6,251,970 B1 | * | 6/2001 | Persiani et al. | 428/308.4 |
| 6,319,599 B1 | * | 11/2001 | Buckley | 428/308.4 |
| 6,387,482 B1 | * | 5/2002 | Persiani et al. | 428/327 |
| 6,393,810 B1 | * | 5/2002 | Mier | 54/82 |
| 6,508,205 B1 | * | 1/2003 | Zink | 119/850 |

* cited by examiner

*Primary Examiner*—Teri Pham Luu
*Assistant Examiner*—Elizabeth Shaw
(74) *Attorney, Agent, or Firm*—Hovey Williams LLP

(57) ABSTRACT

A two-component protective equine leg wrap (10) is provided which is designed for application to the lower part (16) of a horse's leg. The wrap (10) includes a panel (12) having a fetlock joint-receiving section (28) which is adapted to be applied to the leg part (16) and secured by means of connection straps (50). A separate reinforcing strap (14) also forms a part of the wrap (10) and is configured for attachment to the applied panel (10) to provide additional fetlock joint support and protection. The panel (12) preferably includes an inner laminate layer (30) made up of a foam body having a plurality of phase change microcapsules embedded therein to lessen heat buildup, and an outer breathable laminate layer (32).

25 Claims, 2 Drawing Sheets

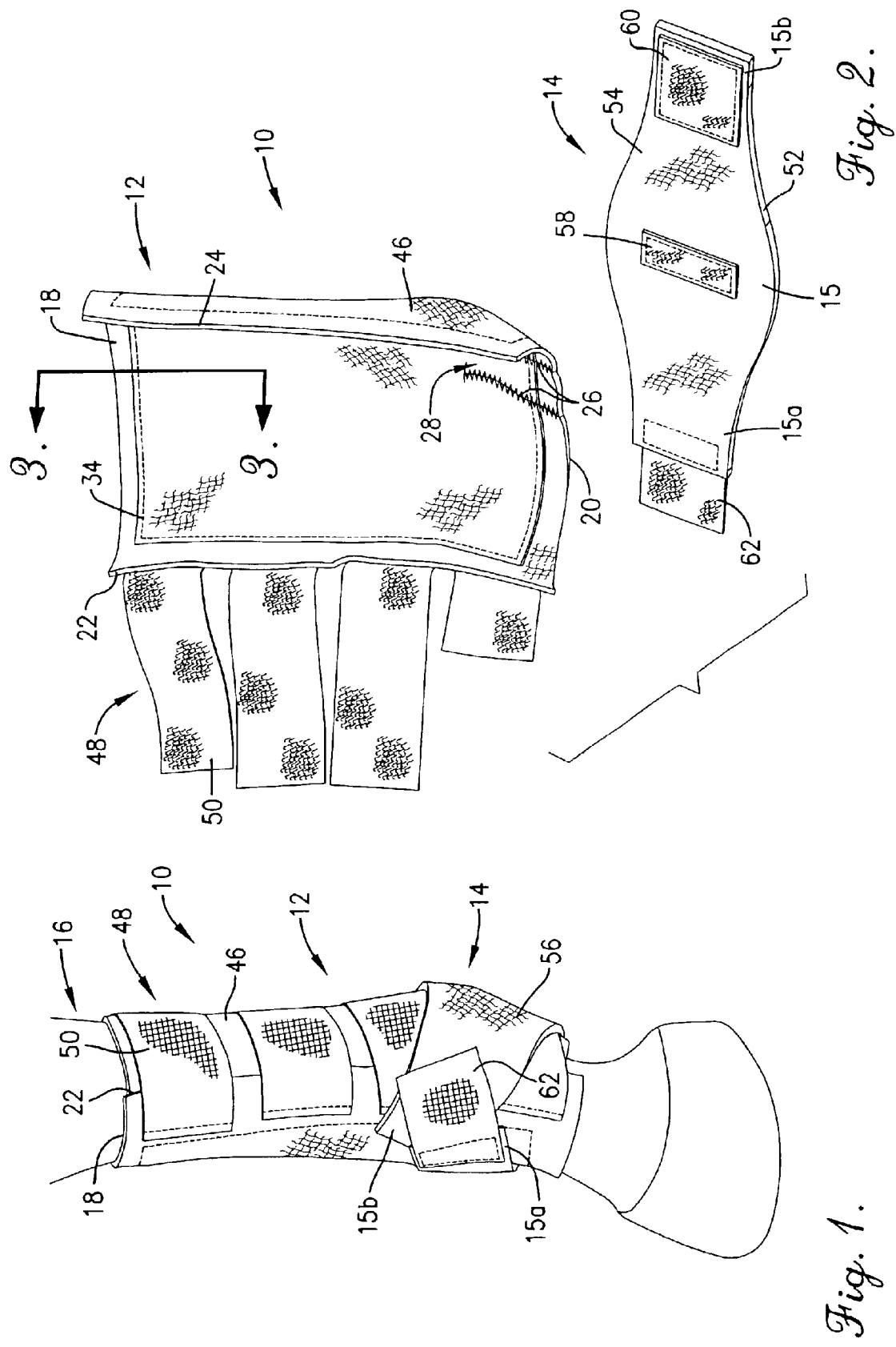

BREATHABLE EQUINE LEG WRAP

BACKGROUND OF THE INVENTION

1. Field of the Invention

The present invention is broadly concerned with improved protective wraps adapted for application to the lower legs of horses in order to provide comfort and protection for the horse. More particularly, the invention is concerned with improved equine leg wraps including a flexible main panel configured for wrapping about the horse's leg including the fetlock joint, with a separate reinforcing strap which can be custom placed and secured about the applied panel. Preferably, the main panel includes an inner laminate layer made up of a resilient foam having embedded therein a plurality of phase change microcapsules serving to eliminate heat buildup.

2. Description of the Prior Art

Many horses, and especially competition horses, are prone to lower leg injuries resulting from stress and shock forces incurred during running or performing. Such forces may result from external impacts due to the horse kicking itself or being kicked by other horses. In order to ameliorate these problems, flexible support wraps or boots have been developed in the past to protect the lower legs of horses and to provide support for the tendons, bones and ligaments in the horse's legs.

For example, U.S. Pat. Nos. 5,910,126, 5,115,627 and 5,579,627 describe various types of equine leg wraps and supports. Generally speaking, these prior devices include flexible panels configured to wrap about the lower portions of horse's legs and have attachment means for securing the panels in place. Typically, the flexible panels are formed of resilient neoprene or similar foam materials having conventional fabric facings.

A serious problem encountered with these prior equine leg wraps stems from the buildup of heat, particularly when the horse is running or engaged in competition. Such heat buildup can be very uncomfortable, and even injure the horse; for example, it is believed that undue heat buildup can cause a condition known as "bowed tendons."

Furthermore, the one-piece equine leg wraps of the prior art may not provide an adequate degree of protection and support for all horses. For example, U.S. Pat. No. 5,579,627 describes a wrap including an integral lower fastener to provide additional support for the fetlock joint. However, owing to the fact that this support is integral with the panel itself, it cannot be adjusted in terms of position to provide the maximum degree of support for all horses.

There is accordingly a need in the art for improved equine leg wraps which overcome the persistent problems of heat buildup and inadequate fetlock joint support.

SUMMARY OF THE INVENTION

The present invention overcomes the problems outlined above and provides a protective wrap adapted for application to the lower leg of a horse. Broadly speaking, the wrap of the invention includes a flexible panel presenting upper, lower and side margins, with a concavo-convex or cup-like section formed in the panel adjacent the lower margin thereof between the side margins. The overall panel is configured for application to a horse's lower leg with the concavo-convex section receiving the fetlock joint of the horse's leg, and with the remainder of the panel disposed about adjacent leg portions. A fastening assembly is provided for securing the panel to the horse's leg, and preferably is in the form of a plurality of attachment straps. The overall wrap further includes an elongated reinforcing strap separable from the panel and configured for selective attachment about the panel when applied to the horse's leg. The reinforcing strap includes a central section configured for engaging the applied panel at an area corresponding to the lower portion of the horse's fetlock joint with securement sections extending from the central strap section and operable to attach the reinforcing strap about the main panel.

In preferred forms, the panel includes an inner laminate layer comprising a preferably open cell foam body having a plurality of microcapsules embedded therein, with the microcapsules containing a phase change material such as one or more paraffinic hydrocarbons. The microcapsule-loaded foam body has inner and outer facings, preferably formed of a nylon-based fabric. The panel further includes an outer laminate layer secured by stitching or other means to the inner laminate layer. The outer layer advantageously includes a breathable resilient foam layer such as an open cell neoprene or ester layer. The foam layer is faced with a nylon-based fabric as an inner facing, and a conventional nylon UBL fabric as the outer facing.

If desired, the inner region of the panel may be equipped with a cushioning pad formed of open cell neoprene or similar material such as a closed cell perforated foam permitting transmission of air. This cushioning pad extends vertically along the length of the panel and provides an added degree of protection for the horse.

BRIEF DESCRIPTION OF THE DRAWINGS

FIG. 1 is a perspective view of an equine protective wrap in accordance with the invention, illustrated as applied to the lower part of a horse's leg;

FIG. 2 is a perspective exploded view of the protective wrap, illustrating the main panel and separable reinforcing strap;

DETAILED DESCRIPTION OF THE PREFERRED EMBODIMENT

Figure 3:
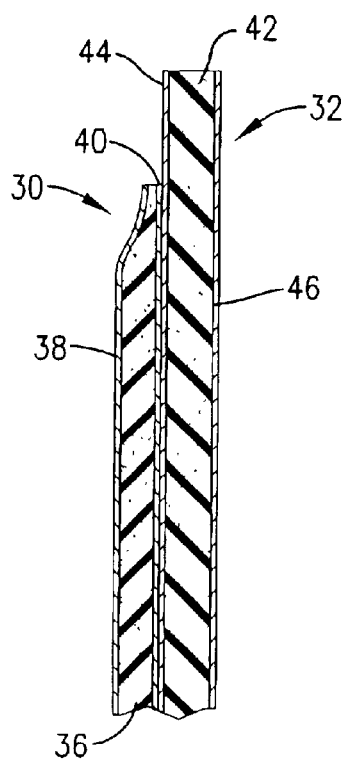
FIG. 3 is an enlarged sectional view taken along line 3—3 of FIG. 2 and illustrating the laminate construction of the panel.

Turning now the drawings, a two-part equine leg protective wrap 10 is illustrated in FIGS. 1 and 2, and broadly includes a panel 12 and a separate reinforcing strap 14. It will be observed that the panel 12 is configured to wrap about the lower portion 16 of a horse's leg, receiving the fetlock joint thereof. The strap 14 includes a central section 15 as well as endmost securement sections 15a, 15b.

In more detail, the panel 12 is of dual laminate construction and presents an upper margin 18, a lower margin 20, and spaced apart side margins 22, 24. The panel has, by virtue of lower stitching 26, a concavo-convex or cup-like section 28 adjacent the lower margin 20. The section 28 is designed so as to receive and comfortably accommodate the horse's fetlock joint.

Referring to FIG. 3, it will be seen that the panel 12 is formed of an inner laminate layer 30 and an outer laminate layer 32. The layers 30, 32 are interconnected by marginal stitching 34 (FIG. 2), with the outer layer 32 being slightly larger than the corresponding inner layer 30.

Inner laminate layer 30 is designed to provide dynamic temperature control and includes an inner foam body 36 with inner and outer fabric facings 38 and 40. The facings 38, 40 are preferably made of a fabric comprising nylon, and especially a nylon/lycra blend (83% nylon/17% lycra). This fabric is commercialized under the designation Dryz® by Dicon Technologies of Fair Lawn, N.J., and serves as an antimicrobial barrier; it also permits passage of moisture through the remainder of the wrap 10. The foam body 36 may be made up of a variety of suitable foams (e.g., "breathable" polyurethane, ethylene/vinyl acetate copolymer, latex, polyethylene, polypropylene, silicon, cellulose acetate, neoprene, and polyvinylchloride foams), especially neoprene foams. However, the body 36 also has interspersed and embedded therein a large number of microcapsules including a phase change material. In practice, the foam body 36 is formed of Comfor Temp® material commercialized by Frisby Technologies, Inc. This foam material includes Frisby's micron-sized Thermasorb® phase change microcapsules therein; alternately, Dicon's Intellitemp® would be suitable. Generally speaking, the microcapsules have an average diameter of from about $1\propto 1,000$ microns, and have a paraffinic hydrocarbon phase change material with a surrounding synthetic resin capsule. Such microcapsules and complete foam products are described in U.S. Pat. No. 5,637,389, incorporated by reference herein.

The outer laminate layer 32 is of breathable construction and includes an open cell neoprene foam layer 42 with an inner facing 44 and an outer facing 46. In this case, the inner facing 44 is formed of a fabric comprising nylon whereas the outer facing 46 is made of nylon UBL (unbroken loop) which is an effective loop Velcro material. In this way, moisture and/or air may pass through the layer when the wrap 10 is applied.

The overall panel 12 further includes a fastening assembly 48, in this instance a plurality of elongated connection straps 50 secured to the panel 12 by stitching adjacent side marginal edge 22. The straps 50 are formed of Velcro hook material which is adapted for mating, separable connection to the nylon UBL material of outer facing 46. It will be observed that the respective straps 50 are of a length for maintaining the panel 12 in conforming application to the lower portion 16 of the horse's leg as will be explained.

The reinforcing strap 14 is made up of the same materials as outer laminate layer 32, i.e., it includes an open cell neoprene foam layer 52, an inner nylon fabric facing 54 and a nylon UBL outer facing 56. In addition, the inner surface of strap 14 at central section 15 is equipped with an elongated Velcro hook segment 58, and an endmost Velcro hook patch 60 is secured to securement section 13b; the segment 58 and patch 60 are attached by stitching to the strap 14. Finally, the section 13a comprises a connector 62 attached by sewing to the opposite end of strap 14, the connector 62 being formed of Velcro hook material attachable to the outer nylon UBL facing 56.

The application of wrap 10 to the lower portion 16 of a horse's leg is best understood from a consideration of FIG. 1. That is, the panel 12 is initially positioned adjacent the rear portion of the horse's leg, with the section 28 receiving and substantially surrounding the horse's fetlock joint. Thereupon, the remainder of the panel is applied about the horse's leg, with side marginal edge 22 in overlapped relationship relative to edge 24. The connection straps 50 are then pulled laterally and secured to the outer nylon UBL facing 46 of the panel.

At this point, the separate reinforcing strap 14 is applied to the in-place panel 10. This involves positioning the central section 15 of the strap 14 adjacent the lower regions of the panel 12 corresponding to the lower part of the horse's fetlock joint, and securing the strap 14 via the Velcro segment 58. Next, the strap 14 is firmly secured in place by first attaching the patch 60 to the facing 46 and then overlapping the strap end with Velcro connector 62.

Figure 4:
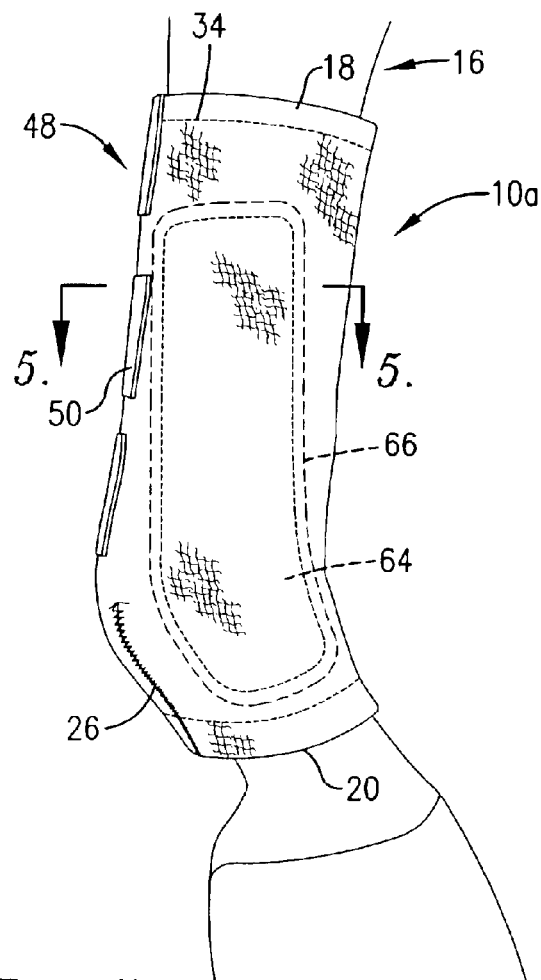
FIG. 4 is a side elevational view of another embodiment of the invention, with the panel applied to the lower portion of a horse's leg and depicting the inner reinforcing pad forming a part of the panel.
Figure 5:
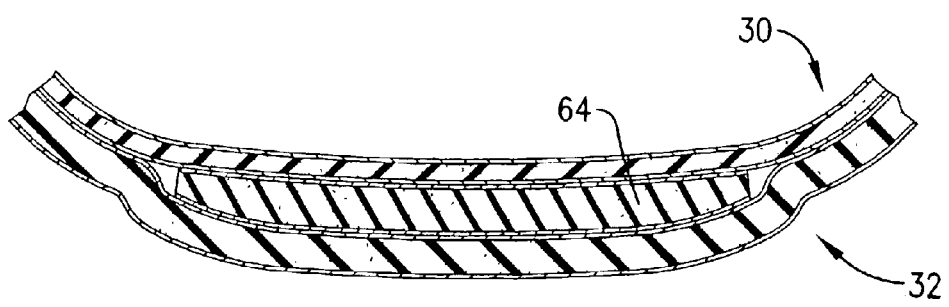
FIG. 5 is a sectional view taken along line 5—5 of FIG. 4 and illustrating the construction thereof at the region of the reinforcing pad.

FIGS. 4 and 5 illustrate another embodiment in accordance with the invention, including a panel 10a and separate strap 14. The panel 10a is identical with panel 10 except for the provision of an elongated cushioning pad 64 along the inner part of the wrap to provide extra protection for the horse's leg. As illustrated in FIG. 5, the pad 64 (which may be formed of any resilient protective material such as neoprene) is sandwiched between the inner and outer laminate layers 30, 32, with appropriate stitching 66 to maintain the pad 64 in place. In all other respects, the panel 10a is identical with panel 10, and accordingly like reference numerals have been applied. While the reinforcing strap 14 is not illustrated in FIG. 4, it will be understood that the complete wrap would include this component as well.

The use of phase change microcapsules in the inner laminate layer 30 of panel 10 provides a number of very significant advantages. That is, this construction serves to maintain a substantially constant, relatively cool temperature adjacent the horse's leg, and avoids the heat buildup problems associated with prior equine leg wraps. Moreover, use of the breathable layer 32 also facilitates temperature control and avoids moisture accumulation. Of course, provision of the separate reinforcing strap 14 permits the user to custom place the strap to accommodate different horses, while also permitting application at various compression levels without creating

I claim:

1. A protective wrap adapted for application to the lower leg of a horse and comprising:
   a flexible panel presenting an upper margin, a lower margin, and a pair of spaced side margins, there being a concavo-convex section formed in said panel proximal to said lower margin and between said side margins, said panel configured for application to a horse's lower leg with said section receiving the fetlock joint of a horse's leg, and with the remainder of the panel disposed about adjacent portions of the horse's leg;
   a fastening assembly for securing said panel to said horse's leg; and
   an elongated reinforcing strap separable from said panel and configured for selective attachment about said panel when the panel is applied to said horse's leg, said reinforcing strap including a central section configured for engaging said panel at an area corresponding to the lower portion of the horse's fetlock joint, and securement sections extending from said central section operable to attach the strap about said panel.

2. The wrap of claim 1, said fastening assembly comprising a plurality of elongated connectors secured to said panel adjacent one of said side margins and of a length to extend across the juncture between the side margins when the panel is applied to said horse's leg for attachment to the panel proximal to the other of said side margins.

3. The wrap of claim 2, said connectors presenting an attachment surface, said panel presenting a strap attachment surface there being complemental hook and loop material securing said connector attachment surface and said strap attachment surface.

4. The wrap of claim 1, the central section of said strap including an attachment surface operable for attachment of the central section to said panel.

5. The wrap of claim 1, said panel presenting an inner laminate layer including a foam body having a plurality of microcapsules embedded therein, said microcapsules containing a phase change material.

6. The wrap of claim 5, said microcapsules having an average diameter of from about 1–1,000 microns.

7. The wrap of claim 5, said phase change material selected from the group of paraffinic hydrocarbons.

8. The wrap of claim 5, said foam body selected from the group consisting of polyurethane, ethylene/vinyl acetate copolymer, latex, polyethylene, polypropylene, silicon, cellulose acetate, neoprene, polyvinylchloride, polyester and ester foams.

9. The wrap of claim 5, said foam body having an inner and an outer fabric facing.

10. The wrap of claim 9, said facing formed of a material comprising nylon.

11. The wrap of claim 5, including an outer laminate layer secured to said inner laminate layer, said outer laminate layer comprising an open cell neoprene foam layer.

12. The wrap of claim 11, said open cell neoprene foam layer having an inner and an outer facing.

13. The wrap of claim 12, said inner facing formed of a fabric comprising nylon.

14. The wrap of claim 12, said outer facing formed of nylon unbroken loop material.

15. The wrap of claim 11, said inner and outer laminate layers being secured together by stitching.

16. In a protective wrap for application to the lower part of a horse's leg and including a panel configured for wrapping about the horse's leg, the improvement which comprises an inner layer forming a part of the panel, said inner layer including an open cell breathable foam body having a plurality of microcapsules embedded therein, said microcapsules containing a phase change material, said wrap further including an outer laminate layer secured to said inner laminate layer, said outer laminate layer formed of an open cell breathable synthetic resin foam material, there being a first fabric facing applied to the inner face of said foam body and a second fabric facing applied to the outer surface of said outer laminate layer, said first and second facings formed of a fabric permitting passage of moisture therethrough.

17. The wrap of claim 16, said microcapsules having an average diameter of from about 1–1,000 microns.

18. The wrap of claim 16, said phase change material selected from the group of paraffinic hydrocarbons.

19. The wrap of claim 16, said foam body selected from the group consisting of polyurethane, ethylene/vinyl acetate copolymer, latex, polyethylene, polypropylene, silicon, cellulose acetate, neoprene, and polyvinylchloride foams.

20. The wrap of claim 16, said first and second facings formed of a material comprising nylon.

21. The wrap of claim 16, said outer laminate layer comprising an open cell neoprene foam.

22. The wrap of claim 21, said inner and outer laminate layers being secured together by stitching.

23. The wrap of claim 16, said second facing formed of nylon unbroken loop material.

24. The wrap of claim 16, said panel including a lower concavo-convex section configured to receive the fetlock joint of said horse's leg when the panel is applied to the horse's leg.

25. The wrap of claim 16, including a fastening assembly for securing said panel to the horse's leg.

\* \* \* \* \*